US011878308B2

(12) United States Patent
Malkamäki et al.

(10) Patent No.: US 11,878,308 B2
(45) Date of Patent: Jan. 23, 2024

(54) CRUSHER MANTLE LIFTING DEVICE, AN ARRANGEMENT AND A METHOD

(71) Applicant: Metso Outotec Finland Oy, Tampere (FI)

(72) Inventors: Mikko Malkamäki, Pälkäne (FI); Tuomas Teeri, Tampere (FI)

(73) Assignee: Metso Outotec Finland Oy, Tampere (FI)

( * ) Notice: Subject to any disclaimer, the term of this patent is extended or adjusted under 35 U.S.C. 154(b) by 375 days.

(21) Appl. No.: 17/270,204

(22) PCT Filed: Aug. 30, 2019

(86) PCT No.: PCT/EP2019/073241
§ 371 (c)(1),
(2) Date: Feb. 22, 2021

(87) PCT Pub. No.: WO2020/043891
PCT Pub. Date: Mar. 5, 2020

(65) Prior Publication Data
US 2021/0308688 A1 Oct. 7, 2021

(30) Foreign Application Priority Data
Aug. 30, 2018 (EP) .................................... 18191728

(51) Int. Cl.
*B02C 2/00* (2006.01)
*B02C 23/00* (2006.01)

(52) U.S. Cl.
CPC .............. *B02C 23/00* (2013.01); *B02C 2/005* (2013.01)

(58) Field of Classification Search
CPC .. B02C 2/00; B02C 2/04; B02C 2/005; B66C 1/422
See application file for complete search history.

(56) References Cited

U.S. PATENT DOCUMENTS 485,944 A * 11/1892 Jones ........................ B66C 1/54 294/97
2,573,867 A * 11/1951 Murray .................. E21B 19/06 294/115

(Continued)

FOREIGN PATENT DOCUMENTS

AU 2012101282 A4 9/2012
CN 202912557 U 5/2013

(Continued)

OTHER PUBLICATIONS

International Search Report and Written Opinion for International Application No. PCT/EP2019/073241 dated Jan. 3, 2020.

(Continued)

*Primary Examiner* — Faye Francis
(74) *Attorney, Agent, or Firm* — Andrus Intellectual Property Law, LLP

(57) ABSTRACT

The present disclosure relates to a crusher mantle lifting device. Attachment elements are configured to be attachable to a crusher mantle. Each attachment element includes a main portion having an inner surface facing the mantle and an outer surface. A locking portion projects from the inner surface and is configured to protrude into a corresponding opening in the mantle. One or more lifting portions project from the outer surface. A tightening means is configured to press the attachment elements towards the crusher mantle. The disclosure also relates to an arrangement and a method.

14 Claims, 5 Drawing Sheets

(56) References Cited

U.S. PATENT DOCUMENTS

| | | | | | |
|---|---|---|---|---|---|
| 2,610,889 | A * | 9/1952 | Penn | B66C 1/54 294/97 |
| 2,949,654 | A | 8/1960 | Luenberger | |
| 3,355,114 | A | 11/1967 | Motz | |
| 3,750,967 | A * | 8/1973 | DeDiemar | B02C 2/005 241/207 |
| 5,323,976 | A | 6/1994 | Johnson et al. | |
| 5,476,300 | A * | 12/1995 | Dodge | B66C 1/54 294/93 |
| 6,543,826 | B1 | 4/2003 | Aston | |
| 6,609,742 | B1 * | 8/2003 | Macom | B66C 1/422 294/90 |
| 10,549,956 | B2 * | 2/2020 | Kuvaja | B02C 23/00 |
| 2013/0043697 | A1 * | 2/2013 | Holmes | B02C 2/005 241/285.2 |
| 2015/0290648 | A1 | 10/2015 | Kuvaja et al. | |

FOREIGN PATENT DOCUMENTS

| | | | |
|---|---|---|---|
| CN | 202945011 | U | 5/2013 |
| CN | 103287965 | A | 9/2013 |
| EP | 2921235 | A1 | 9/2015 |
| JP | 2003159538 | A | 6/2003 |
| JP | 2017 113737 | A | 6/2017 |
| SU | 122665 | A1 | 1/1959 |
| SU | 1041145 | A1 | 9/1983 |
| WO | 2011029133 | A1 | 3/2011 |
| WO | 2016169622 | A1 | 10/2016 |

OTHER PUBLICATIONS

European Search Report for priority European Application No. 18191728.7 dated Feb. 22, 2019.

Search Report and Office Action for Russian Patent Application No. 2021106656, dated Nov. 30, 2022.

Search Report and Office Action for corresponding Chinese Patent Application No. 2019800556386 dated Apr. 7, 2022.

Search Report and Office Action for corresponding Chilean Patent Application No. 202100428 dated Apr. 11, 2022.

* cited by examiner

CRUSHER MANTLE LIFTING DEVICE, AN ARRANGEMENT AND A METHOD

CROSS-REFERENCE TO RELATED APPLICATIONS

This application is the U.S. national stage application of International Application PCT/EP2019/073241, filed Aug. 30, 2019, which international application was published on Mar. 5, 2020, as International Publication WO 2020/043891 A1 in the English language. The International Application claims priority of European Patent Application No. 18191728.7 filed Aug. 30, 2018.

TECHNICAL FIELD

The present invention relates to a crusher mantle lifting device. The invention also relates to an arrangement comprising such a lifting device in combination with a crusher mantle, and to a method for attaching such a lifting device to a crusher mantle.

BACKGROUND ART

Gyratory crushers generally comprise a concave surface and a conical head. The inner cone has a slight circular movement, generated by an eccentric arrangement and as such it does not rotate. Material to be crushed travels downward between the two surfaces being progressively crushed until it is small enough to fall out through the gap between the two surfaces. Gyratory crushers are typically designated in size either by the gap and mantle diameter or by the size of the receiving opening. The crushing action is caused by the closing of the gap between the moveable mantle mounted on the main shaft and the fixed concave liners mounted on the main frame of the crusher. The gap is opened and closed by an eccentric on the bottom of the spindle that causes the central vertical spindle to gyrate.

When installing the mantle of a gyratory crusher supported only by backing material, the mantle is lifted by means of a lifting tool, typically a hydraulic lifting tool, against a head nut of the crusher for a correct height positioning, such that the upper part of the mantle is in contact with the head nut throughout the circumference of the mantle. Similarly, a worn out mantle which needs to be replaced is lifted by means of such a lifting tool. Commonly, new mantles which are to be installed to the gyratory crusher are provided with cast lifting lugs. A hydraulic lifting tool may, for instance by means of chains attached to the lifting lugs, lift the mantle into place. When the mantle has been correctly installed the lifting lugs are removed before operation of the gyratory crusher. Worn mantles are uninstalled and lifted by subsequently adding new lifting lugs which are welded to the mantles. Welded lifting lugs are a risk as there is usually only a visual inspection of the welds before lifting. This is not only a safety risk, but also a time consuming procedure. Furthermore, for both the original lifting lugs and the welded lifting lugs there is no locking system for the lifting chains, which also entails a safety risk. These considerations do not only apply to gyratory crusher mantles, but also other crusher mantles such as cone crusher mantles.

U.S. Pat. No. 5,323,976 discloses a mantle having recesses. Lifting brackets may be connected to the mantle by a simple bolt and nut fixation at the recess. In an alternative embodiment, lifting hooks are simply inserted into the recesses. Although both of these alternatives avoid the time consuming operation of removing lifting lugs and welding new lifting lugs to a mantle, these simple connections to the mantle are far from satisfactory from a safety perspective.

There is still a need for a solution to lifting a crusher mantle which is satisfactory both from a safety perspective and a time consumption perspective.

SUMMARY OF THE INVENTION

It is an object of the invention to mitigate the drawbacks of the known solutions for lifting a crusher mantle. This and other objects, which will become apparent in the following, are accomplished by means of a lifting device as defined in the independent claim.

The present invention is based on the realization that a locking portion which protrudes into an opening of a mantle for transmitting a lifting force into the mantle may be locked in place by two different pressing means, resulting in increased safety and still allowing for a time efficient lifting procedure. In particular, it has been found advantageous to have such a double-pressed locking portion made integrated or integral with the element that is connected to a lifting tool (e.g. via a chain assembly), rather than having a separate locking solution such as fixating the plate with a bolt which engages a nut in the mantle (such as in U.S. Pat. No. 5,323,976). That being said, it is conceivable to integrate the locking portion to the element by e.g. a threaded connection between the locking portion and the element (which may be advantageous in case the locking portion needs to be exchanged due to wearing). Other options for integrating the locking portion to the element is by welding or shrinking.

According to a first aspect of the invention, there is provided a crusher mantle lifting device. The lifting device may, for instance, be used for a gyratory crusher mantle or a cone crusher mantle. The lifting device comprises:

- two or more attachment elements, each attachment element being configured to be attachable to an outer surface of a crusher mantle, each attachment element comprising:
  - a main portion having first and second opposite surfaces, wherein said first surface is configured to meet the outer surface of the mantle when the attachment element is attached and said second surface is configured to face away from the outer surface of the mantle,
  - a locking portion projecting from the first surface of the main portion, said locking portion being configured to protrude into a corresponding opening in the outer surface of the mantle when the attachment element is attached, and
  - one or more lifting portions projecting from the second surface of the main portion, each of said one or more lifting portions defining a respective lifting point on which a respective lifting force is exertable by a lifting tool,
- the crusher mantle lifting device further comprising tightening means configured to press the two or more attachment elements towards the outer surface of the crusher mantle when the attachment elements are attached.

In the present application certain directional terms are used, including distal, proximal, inner and outer. In particular, the attachment element is sometimes described as having a proximal end and a distal end. The following should therefore be understood; in normal use, when the attachment element is attached to the tapered mantle, a proximal direction is generally along outer surface of the mantle in the direction from the largest diameter of the mantle towards the smallest diameter of the mantle, whereas a distal direction is the opposite direction. Thus, in normal use, the distal end of the attachment element is intended to be located further away from, for instance, a chain suspension of the lifting device (and usually at a lower vertical level) than the proximal end. Thus, when an attachment element is connected to a lifting tool in order to lift the attachment element attached to the mantle, then the lifting force has at least a component directed in the proximal direction of the attachment element. An inner part is intended to be located closer to the centre axis of the mantle than an outer part.

Each attachment element may suitably be shaped to substantially conform to a portion of the contour of the mantle to which it will be attached. The main portion of the attachment may, for instance, be formed as a curved plate, or as several consecutive plate sections forming an angle relative to each other to substantially follow the curvature of the outer surface of the mantle in its circumferential direction.

The first surface of the main portion of the attachment element may also be regarded as a mantle-abutting surface or as an inner surface (since it will be facing the centre axis of the mantle when the attachment element has been attached to the outer surface of the mantle. Correspondingly, the second surface of the main portion of the attachment element may also be regarded as an outer surface. In other words, as seen from a centre axis of the mantle to which the attachment element is to be attached, the first surface is configured to be located at a smaller radial distance to the centre axis than the second surface, when the attachment element is attached to the outer surface of the mantle.

Since the attachment element may substantially follow the curvature of the mantle in its circumferential direction, in at least some example embodiments, the first surface of the main portion may be a generally concave surface, and the second surface may be a generally convex surface. It should be understood that the expressions “generally concave surface” and “generally convex surface” does not mean that the surfaces have to form a curvature without straight lines. Rather, as explained above, the surfaces may be formed by several consecutive straight sections, wherein each section is provided at an angle to the neighbouring section or sections.

The locking portion may in some embodiments be made in one piece with the main portion, while in other embodiments it may be integrally connected to the main portion of the attachment element, e.g. by means of a threaded connection by welding or shrinking. The locking portion is configured to project from the first surface inwardly, suitably towards the centre axis of the mantle. The locking portion may suitably be centred with respect to a transverse direction of the first surface (which will substantially conform with the circumferential direction of the mantle when the attachment element is attached to the mantle). The transverse direction may suitably be perpendicular to both the proximal-to-distal direction and the inner-to-outer direction.

In at least some example embodiments the locking portion is located proximally of the tightening means. In at least some example embodiments, the locking portion is located distally of said lifting point on which a lifting force is exertable. Although one locking portion per attachment element may suffice, it is also conceivable to have two or more locking portions for protruding into respective openings in the mantle.

Although one lifting portion may suffice, each attachment element may suitably be provided with at least two lifting portions. The lifting portions projecting outwardly (i.e. radially away from the centre axis of the mantle) may suitably be spaced apart for improved stability and load distribution. The lifting portions may suitably be spaced apart in the transverse direction. According to at least one example embodiment, each attachment element comprises two lifting portions projecting from the second surface of the main portion at opposite sides of a centre symmetry axis of the attachment element extending from the distal end to the proximal end of the main portion.

Each lifting portion define a lifting point on which the lifting force is exertable by the lifting tool. In practice the lifting point may be regarded as an area of the lifting portion. For instance, it may be an area with which a chain assembly (or other type of traction assembly, such as wire, cable, rod, etc.) is engaged. For instance, the outwardly projecting lifting portion may be provided with a through hole to which the chain assembly or the like may be engaged, e.g. by a pin of the chain assembly extending through the through hole. A proximal area of a through-hole defining surface would then normally be subjected to the lifting force transmitted via the pin. That proximal area would be considered a lifting point. Thus, according to at least one example embodiment, each of the one or more lifting portions comprises a through hole located at the lifting point.

According to at least on example embodiment, the crusher mantle lifting device further comprises a main lifting element and a chain assembly, wherein the chain assembly connects each lifting point of the one or more lifting portions to the main lifting element. According to at least one example embodiment, the main lifting element has receiving means, such as holes, for receiving an end portion of a chain, wherein the distance between the receiving means is shorter than the top diameter of the mantle to which the attachment elements are configured to be attached. This ensures that, in operation, the chains will extend from the lifting points of the attachment elements towards the receiving means at an inclination approaching the centre axis of the mantle. This will further enhance the pressing of the locking portions inwardly towards the mantle centre.

It should be understood that since the lifting portion is projecting from the second surface, and the lifting point is defined by the lifting portion, the lifting point will be spaced from the main portion. In other words, seen in a radial direction, the second surface is located between the first surface and the lifting point. The radial or outwardly spacing of the lifting point relative to the main portion may depend on e.g. the degree of taper of the mantle to which the attachment element is to be attached, chain lengths, etc.

In practical use, each attachment element is configured to be positioned in relation to the mantle such that a respective lifting force exerted by the lifting tool on each lifting point has a component directed in a proximal direction of the attachment element.

According to at least one example embodiment, the main portion of each attachment element comprises a distal end and a proximal end, wherein each attachment element is provided with a part of the tightening means or with a part for receiving the tightening means, wherein said part is located closer to the distal end than the locking portion. This provides for a pressing force to be arranged distally of the locking portion. As mentioned previously, the one or more lifting points are suitably arranged proximally of the locking portion, which allows a pressing force to be arranged proximally of the locking portion. The double pressing of the locking portion into the opening of the crusher mantle is particularly advantageous when applied from two sides of the locking portion, i.e. both proximally and distally.

The pressure applied by the tightening means is reflected in at least one example embodiment, according to which said tightening means is configured to press each of the two or more attachment elements towards the outer surface of the crusher mantle by exerting pressure on said attachment element distally to said locking portion and said one or more lifting portions.

According to at least one example embodiment, the tightening means comprises a tightening element configured to be disposed around a circumference of the crusher mantle and the two or more attachment elements. Thus, the tightening means may be arranged to encircle the attachment elements when attached to the crusher mantle, and to exert a radially compressive force. The inwardly directed force applied to the second surface of the main portion of the attachment element will be transmitted to the locking portion of the respective attachment element which will be pressed towards the mantle centre. Although such a compressive force may be provided by different tightening means, including naturally or spring-biased means, in at least some example embodiments the tightening element may suitably be in the form of a tightening strap, a wire or a chain.

The previously discussed part of the tightening means or part for receiving the tightening means may suitably be a holding portion of the attachment element. Thus, according to at least one example embodiment, each attachment element comprises a holding portion projecting from the second surface of the main portion, wherein the holding portion defines a loop, through hole, or a recess, configured to hold the tightening element. Thus, according to at least one example embodiment, the holding portion is located distally to said locking portion and said one or more lifting portions. In embodiments that encompass a tightening strap, the strap may be placed to pass through the holding portion, similarly to a belt made to pass through loops of a pair of trousers. The strap may be tightened around the attachment elements and the mantle by conventional means, such as heavy duty buckles and ratchets.

According to at least one example embodiment, the locking portion extends from the first surface at least partly in a proximal direction. Suitably, the extension of the locking portion is such that, when the respective lifting force is supplied by the lifting device, each attachment element is pressed towards the outer surface of the crusher mantle. Thus, it should be understood that the locking portion of each attachment element may have an oblique, non-perpendicular, extension from the first surface of the main portion. In other words, the locking portion may extend at an inclination inwardly and proximally from the first surface.

According to at least one example embodiment, the locking portion is cylindrically shaped, said locking portion being configured to protrude into a corresponding cylindrical opening in the outer surface of the crusher mantle when attached. The cylindrically shaped locking portion may suitably be solid. Although a cylindrically shaped locking portion is advantageous from a strength perspective, differently shaped locking portions are also conceivable, such as polygonal (for instance for providing a rotational locking). The diameter of the locking portion and the corresponding opening in the mantle may be chosen based on factors, such as weight and size of the mantle. The locking portion may suitably, but not necessarily, have a diameter which is greater than the thickness of the main portion of the attachment element (i.e. the distance between the first surface and the second surface).

According to a second aspect of the invention, an arrangement is provided. The arrangement comprises:

- a crusher mantle having an outer surface, wherein the mantle has two or more openings in the outer surface, and
- a crusher mantle lifting device according to any embodiment of the first aspect of the invention,
- wherein, when each attachment element is attached to the mantle, the locking portion protrudes into a corresponding one of said openings in the outer surface of the mantle, and the tightening means press the two or more attachment elements against the outer surface of the mantle.

The crusher mantle man be provided with said openings in the outer surface at the time of manufacturing of the mantle. However, it is also conceivable to subsequently create such openings on already existing crusher mantles.

Some crusher mantles may have varying degrees of taper of the outer surface. For instance, from the end having the largest diameter (normally the lower end) towards an intermediate geometrical plane parallel with the ends of the mantle, the outer surface of the mantle may have a relatively smaller degree of taper. Furthermore, the outer surface of the mantle may have a relatively larger degree of taper from said intermediate geometrical plane to the end having the smallest diameter (normally the upper end). This larger degree of taper may on at least some mantles be seen as a bevelled end portion. According to at least one example embodiment, the openings for receiving the locking portions of the attachment elements are provided in a bevelled end portion of the outer surface of the mantle.

It should be understood that the arrangement of the second aspect may be implemented with a system having any functional and/or structural feature or features of the first aspect of the invention.

According to a third aspect of the invention, there is provided a method for attaching a crusher mantle lifting device according to the first aspect of the invention to a crusher mantle, the method comprising:

- placing two or more attachment elements of the crusher mantle lifting device onto an outer surface of a crusher mantle such that respective locking portions of the two or more attachment elements protrude into corresponding openings in an outer surface of the crusher mantle,
- tightening the tightening means so as to press the two or more attachment elements towards the outer surface of the crusher mantle.

According to at least one example embodiment, the method further comprises placing a tightening element around the circumference of the crusher mantle and the two or more attachment elements, wherein tightening the tightening means comprises tightening the tightening element by decreasing a circumferential length thereof. Thus, the tightening element may be tightened similarly to tightening a belt around your waist.

It should be understood that the method of the third aspect may be implemented with a system having any functional and/or structural feature or features of the first aspect of the invention. Similarly, the method of the third aspect may be implemented with an arrangement having any functional and/or structural feature or features of the second aspect of the invention.

DETAILED DESCRIPTION OF THE DRAWINGS

Figure 1:
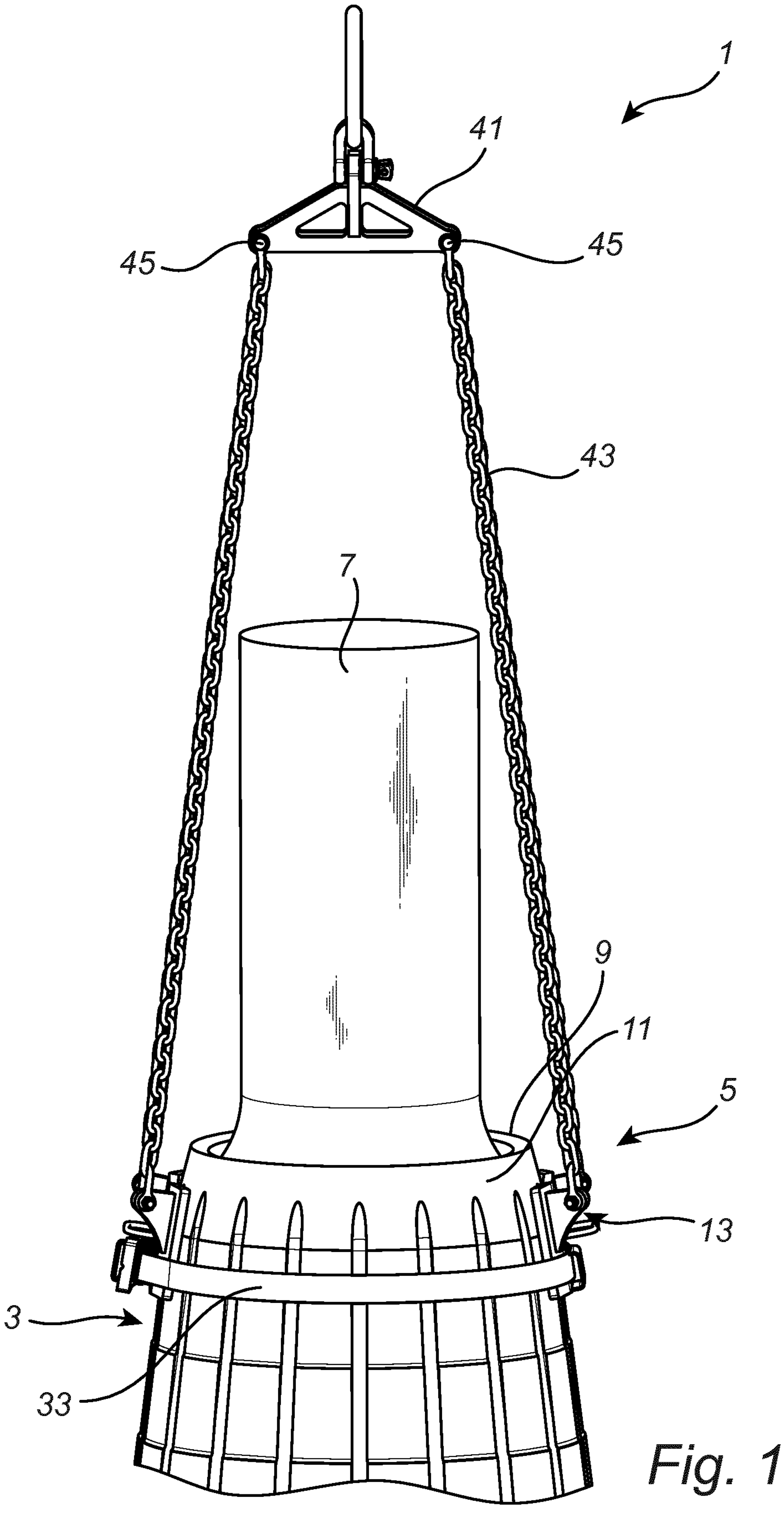
FIG. 1 illustrates, in a side view, an arrangement according to at least one example embodiment of the invention.
Figure 2:
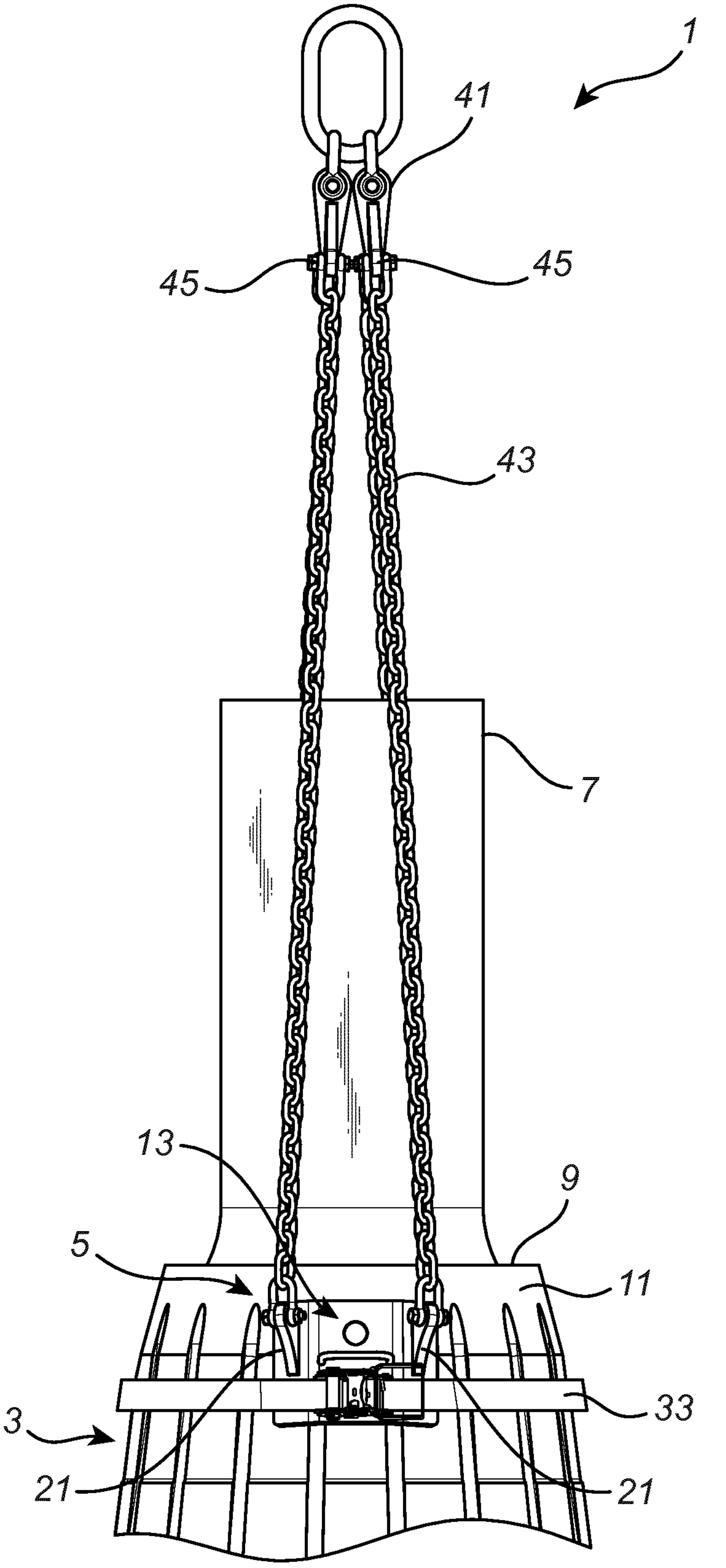
FIG. 2 illustrates the arrangement of FIG. 1 rotated 90°.

FIG. 1 illustrates, in a side view, an arrangement 1 according to at least one example embodiment of the invention. FIG. 2 illustrates the arrangement 1 of FIG. 1 rotated 90°. As can be seen from FIG. 1 and FIG. 2, the arrangement 1 comprises a crusher mantle 3 (only an upper portion of it being visible), such as a gyratory crusher mantle, and a crusher mantle lifting device 5 for connecting the crusher mantle 3 to a lifting tool, such as a hydraulic lifting tool (not shown). In the following detailed description the crusher mantle 3 will, for the sake of simplicity and legibility, only be referred to as "the mantle 3". Similarly, the crusher mantle lifting device 5 will only be referred to as "the lifting device 5".

The mantle 3 is here illustrated as being mounted on a main shaft 7 of a crusher, such as a gyratory crusher. The mantle 3 tapers upwardly from a larger diameter end (not visible) to a smaller diameter end 9. Near the smaller diameter end 9 the angle of taper is increased to form a bevelled end portion 11.

The lifting device 5 comprises two attachment elements 13, which have been attached to the outer enveloping surface of the mantle 3, spaced apart at 180° in the circumferential direction of the mantle 3. However, it is conceivable to have more than two attachment elements 13, such as three or four attachment elements. Suitably, the plurality of attachment elements 13 will be equally spaced around the circumference of the mantle 3.

Figure 4:
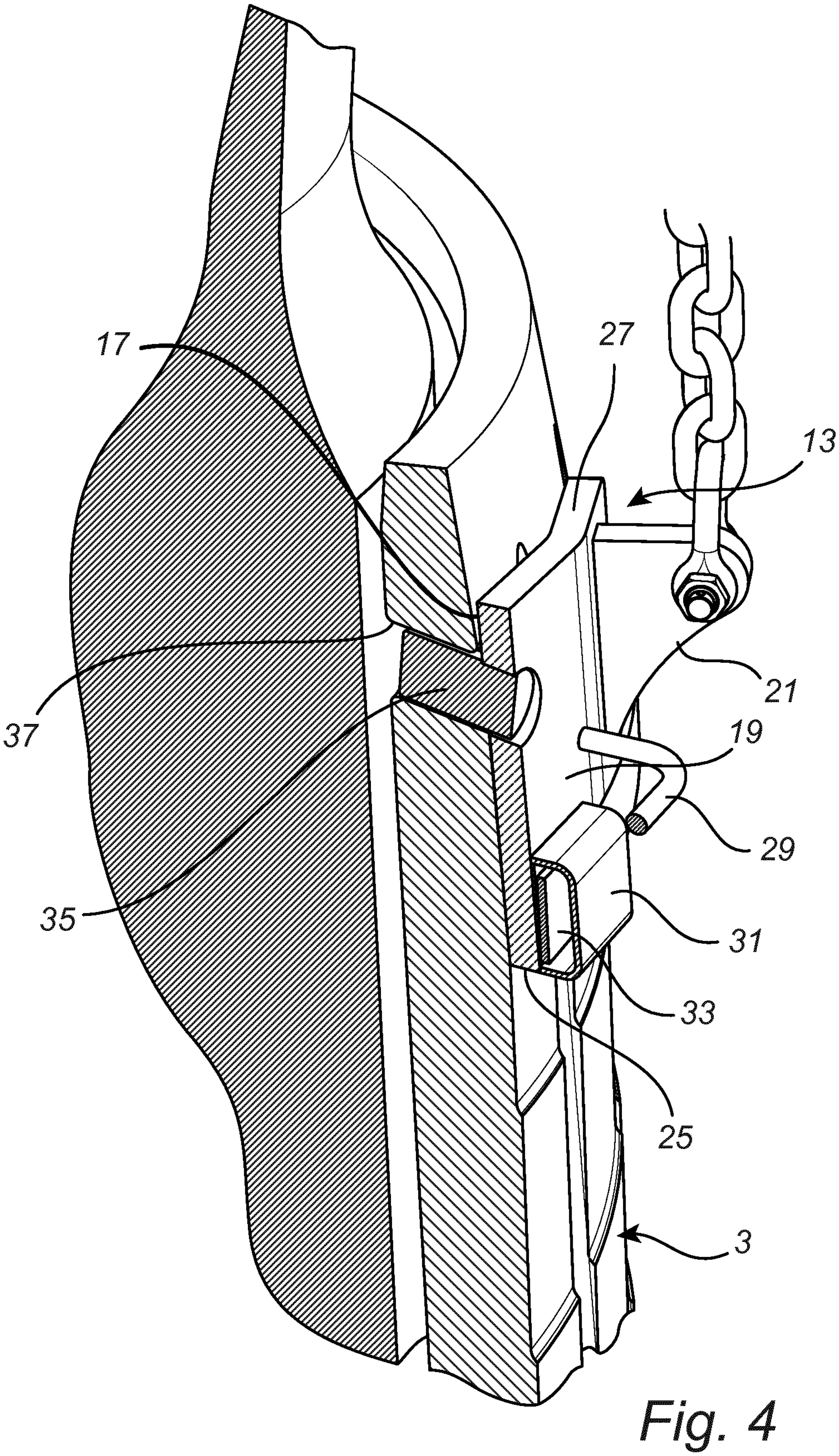
FIG. 4 is a detailed cross-sectional view of said arrangement.
Figure 5:
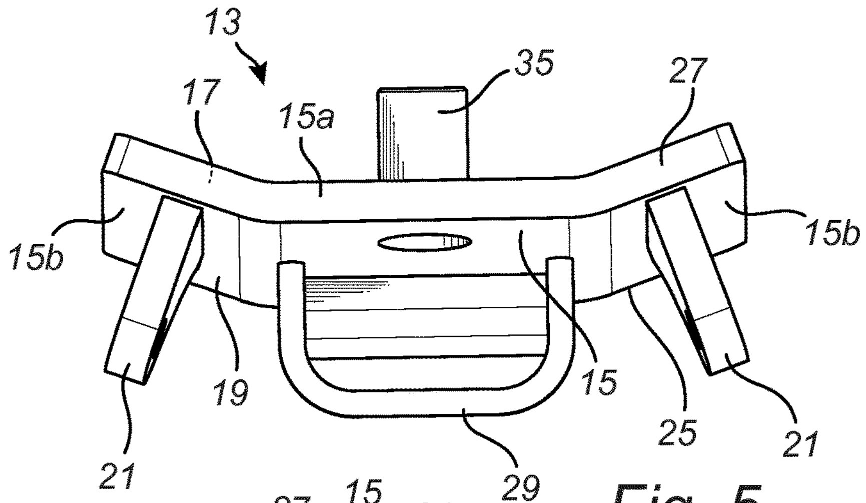
FIG. 5 illustrates, in a perspective view, an attachment element according to at least one example embodiment of the invention.
Figure 6:
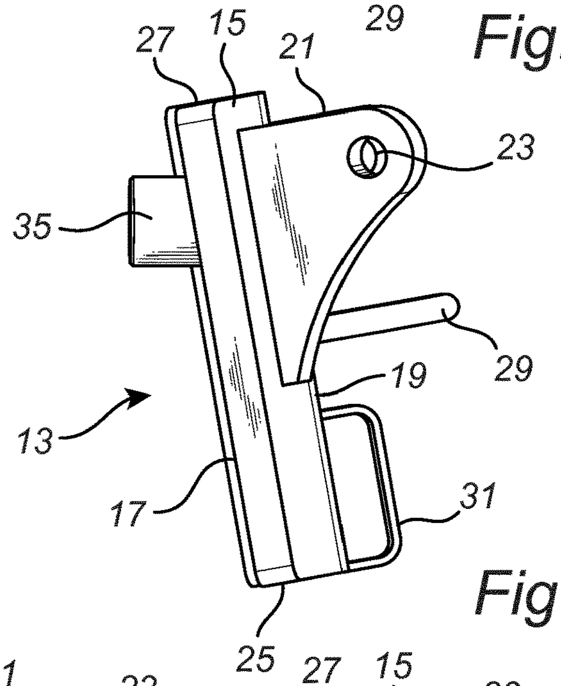
FIG. 6 is a cross-sectional view of said attachment element.
Figure 7:
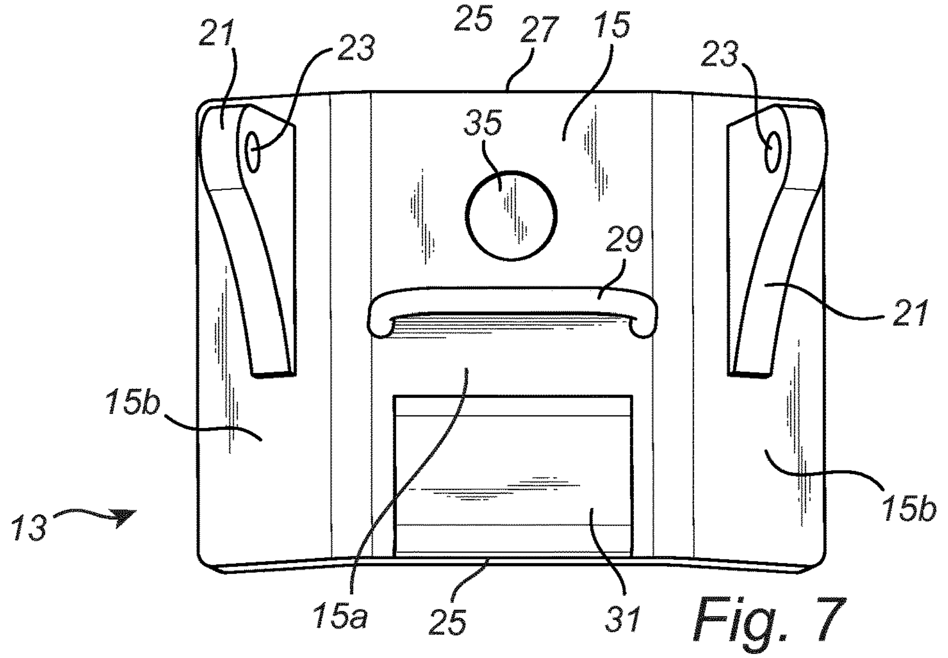
FIG. 7 is a side view of said attachment element.

FIGS. 5-7 illustrate in more detail how such attachment elements 13 may be embodied. Thus, with reference to FIGS. 5-7, the attachment element 13 comprises a main portion 15, which is substantially plate-like. The main portion has a first (inner) surface 17 which is configured to abut the mantle 3 (as can be seen in FIG. 4), and a second (outer) surface 19 which faces away from the mantle 3. As can be seen in FIGS. 5-7, the attachment element 13 comprises two lifting portions 21 projecting from the second surface 19 of the main portion 15. Each lifting portion 21 has a through hole 23 which defines a lifting point on which a respective lifting force is exertable by the lifting tool. A chain assembly may be connected to the through hole 23.

As can be seen in FIGS. 5 and 7, the main portion 15 is provided in three plate sections, namely a middle section **15*a* and two inwardly angled lateral sections 15*b* on either side of the middle section. However, it should be noted that other number of sections or curved main portions may be provided. In any case, the first surface 17 may be substantially concave and the second surface 19 substantially convex. In the illustration of FIG. 5 the each lateral section 15*b* is provided with one of the lifting portions 21. Thus, the lifting portions 21 are provided at opposite sides of a centre symmetry axis extending from a distal end 25 to a proximal end 27** of the main portion.

The second surface 19 is, at the middle section **15*a*, also provided with a handle 29 and a loop 31. The loop 31, which can be regarded as forming part of tightening means, is for guiding a tighting element such as a tightening strap 33 illustrated in FIGS. 1-4. It should be understood that instead of loops 31**, other types of holding portion may be provided for holding/and or guiding the tightening element, such as for instance recesses.

Continuing with FIGS. 6 and 7, as mentioned above, the main portion 15 of the attachment element 13 has a distal end 25 and a proximal end 27. The lifting portions 21 are located nearer the proximal end 27 than the distal end 25. Although the proximal extension may be different in other embodiments, in general it is advantageous to provide the lifting portions 21 proximally of the loop 31. The attachment element 13 is configured to be positioned in relation to the mantle 3 such that a respective lifting force exerted by the lifting tool on each lifting point has a component directed in a proximal direction.

As can be seen in FIGS. 5 and 6, a locking portion 35 projects from the first surface 17 of the main portion (in this illustration from the middle section **15*a*), said locking portion 35 being configured to protrude into a corresponding opening 37 in the outer surface of the mantle 3 when the attachment element 13 is attached (as illustrated in FIG. 4). The locking portion 35 is here illustrated as being substantially cylindrical and mating with a corresponding cylindrical opening 37 in the mantle 3, however, other geometrical shapes are conceivable. Although the locking portion 35 has its main extension directed inwardly (i.e. in a direction towards the centre of the mantle 3 when the attachment element 13 is attached), the projection from the first surface 17 is also slightly towards the proximal end 27 of the main portion 15. Thus, in the illustrated embodiment, the locking portion 35 projects at a non-perpendicular angle from the first surface 17. As can be seen in FIGS. 4, 6 and 7, the locking portion 35 is located closer to the proximal end 27, compared to the loop 31 which is located closer to the distal end 25 of the main portion 15**.

Figure 3:
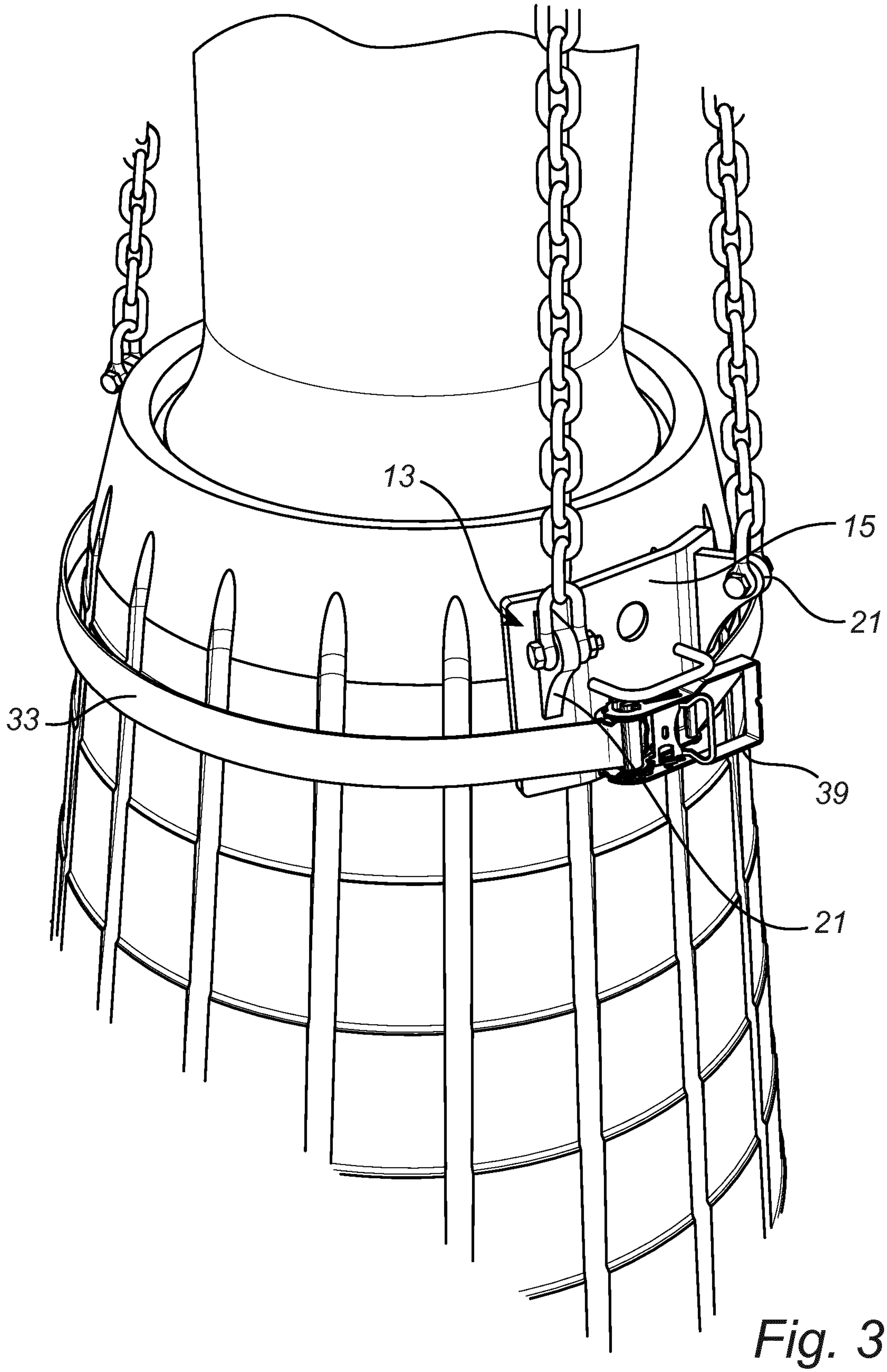
FIG. 3 is a detailed perspective view of said arrangement.

Turning back to FIGS. 1-4, the lifting device 5 further comprises tightening means, herein illustrated as comprising said tightening strap 33 which is disposed around the circumference of the mantle 3 and around the attachment elements 13. The tightening strap 33 is configured to press the attachment elements 13 towards the outer surface of the mantle 3. The tightening strap 33 may suitably be tightened by means of a ratchet 39, as illustrated in FIG. 3.

With reference to FIGS. 1 and 2, the lifting device 5 also comprises a main lifting element 41 and a chain assembly 43 which includes chains extending from the main lifting element 41 to the attachment elements 13. More specifically, the chain assembly 43 connects each lifting point of the lifting portions 21 to the main lifting element 41. In operation a lifting tool will exert a lifting force on the main lifting element 41. The lifting force will be transmitted via the chains to the attachment element 13 and the locking portion 35, the latter extending into the opening 37 in the mantle 3 (see FIG. 4), and hence the mantle 3 will be lifted off the main shaft 7 and can be replaced by another mantle. As can be seen in the example of FIGS. 1 and 2, in operation, the distance between chains is smaller at the main lifting element 41 than at the attachment elements 13. In other words, as illustrated in FIG. 1, the distance between chain receiving means 45 of the main lifting element 41 is shorter than the top diameter at the end 9 of the mantle 3. Furthermore, as illustrated in FIG. 2, the distance between the two chain receiving means 45 that receive chains that extend to two lifting portions 21 on one and the same attachment element 13 is smaller than the distance between said two lifting portions 21. These upwardly and inwardly directed inclinations of the chains will further enhance the pressing of the locking portions 35 inwardly towards the mantle centre.

Each locking portion 35 will be pressed inwardly towards the mantle centre by two applied forces. On the one hand, the traction force from the chains will press the attachment element 13, and thus locking portion 35 inwardly. The locking portion 35 inserted in the corresponding opening 37 in the mantle 3 may be regarded as presenting a pivot point, which will cause the proximal end 27 of the main portion 15 of the attachment element 13 to be pressed against the mantle 3. Similarly the tightening strap 33 will press the distal end 25 of the main portion 15, and thus also the locking portion 35, inwardly. Thus, the tightening strap 33 exterts pressure on said attachment elements 13 distally to the locking portions 35 and the lifting portions 21.

The skilled person realizes that a number of modifications of the embodiments described herein are possible without departing from the scope of the invention, which is defined in the appended claims.

The invention claimed is:

1. A crusher mantle lifting device, comprising:

two or more attachment elements, each attachment element being configured to be attachable to an outer surface of a crusher mantle, each attachment element comprising:

a main portion having first and second opposite surfaces, wherein said first surface is configured to meet the outer surface of the mantle when the attachment element is attached and said second surface is configured to face away from the outer surface of the mantle, a locking portion projecting from the first surface of the main portion, said locking portion being configured to protrude into a corresponding opening in the outer surface of the mantle when the attachment element is attached, and one or more lifting portions projecting outwardly from the second surface of the main portion, each of said one or more lifting portions defining a respective lifting point on which a respective lifting force is exertable by a lifting tool, the crusher mantle lifting device further comprising tightening means configured to press the two or more attachment elements towards the outer surface of the crusher mantle when the attachment elements are attached, wherein the main portion of each attachment element comprises a distal end and a proximal end, wherein each attachment element is provided with a part of the tightening means or with a part for receiving the tightening means, said part being located closer to the distal end than the locking portion.

2. The crusher mantle lifting device according to claim 1, wherein said first surface and said second surface extend from the distal end to the proximal end, wherein each attachment element is configured to be positioned in relation to the mantle such that a respective lifting force exerted by the lifting tool on each lifting point has a component directed in a proximal direction, and wherein said tightening means is configured to press each of the two or more attachment elements towards the outer surface of the crusher mantle by exerting pressure on said attachment element distally to said locking portion and said one or more lifting portions.

3. The crusher mantle lifting device according to claim 2, wherein each attachment element comprises two lifting portions projecting from the second surface of the main portion at opposite sides of a center symmetry axis extending from the distal end to the proximal end of the main portion.

4. The crusher mantle lifting device according to claim 1, wherein the tightening means comprises a tightening element configured to be disposed around a circumference of the crusher mantle and the two or more attachment elements.

5. The crusher mantle lifting device according to claim 4, wherein each attachment element further comprises a holding portion projecting from the second surface of the main portion, wherein the holding portion defines a loop, through hole, or a recess, configured to hold the tightening element.

6. The crusher mantle lifting device according to claim 5, wherein said holding portion is located distally to said locking portion and said one or more lifting portions.

7. The crusher mantle lifting device according to claim 4, wherein the tightening element is a tightening strap, a wire or a chain.

8. The crusher mantle lifting device according to claim 1, wherein the locking portion extends from the first surface at least partly in a proximal direction.

9. The crusher mantle lifting device according to claim 1, wherein the locking portion is cylindrically shaped, said locking portion being configured to protrude into a corresponding cylindrical opening in the outer surface of the crusher mantle when attached.

10. The crusher mantle lifting device according to claim 1, wherein each of the one or more lifting portions comprises a through hole located at the lifting point.

11. The crusher mantle lifting device according to claim 1, further comprising a main lifting element and a chain assembly, wherein the chain assembly connects each lifting point of the one or more lifting portions to the main lifting element.

12. An arrangement comprising:

a crusher mantle having an outer surface, wherein the mantle has two or more openings in the outer surface, and a crusher mantle lifting device comprising:

two or more attachment elements, each attachment element being configured to be attachable to the outer surface of the crusher mantle, each attachment element comprising:

a main portion having first and second opposite surfaces, wherein said first surface is configured to meet the outer surface of the mantle when the attachment element is attached and said second surface is configured to face away from the outer surface of the mantle, a locking portion projecting from the first surface of the main portion, said locking portion being configured to protrude into a corresponding opening in the outer surface of the mantle when the attachment element is attached, and one or more lifting portions projecting outwardly from the second surface of the main portion, each of said one or more lifting portions defining a respective lifting point on which a respective lifting force is exertable by a lifting tool, the crusher mantle lifting device further comprising tightening means configured to press the two or more attachment elements towards the outer surface of the crusher mantle when the attachment elements are attached, wherein the main portion of each attachment element comprises a distal end and a proximal end, wherein each attachment element is provided with a part of the tightening means or with a part for receiving the tightening means, said part being located closer to the distal end than the locking portion, wherein, when each attachment element is attached to the mantle, the locking portion protrudes into a corresponding one of said openings in the outer surface of the mantle, and the tightening means press the two or more attachment elements against the outer surface of the mantle.

13. A method for attaching a crusher mantle lifting device according to claim 1 to a crusher mantle, the method comprising:

placing the two or more attachment elements of the crusher mantle lifting device onto the outer surface of the crusher mantle such that the respective locking portions of the two or more attachment elements protrude into corresponding openings in the outer surface of the crusher mantle; and tightening the tightening means so as to press the two or more attachment elements towards the outer surface of the crusher mantle.

14. The method according to claim 13 wherein the tightening means is a tightening element, further comprising:

placing the tightening element around the circumference of the crusher mantle and the two or more attachment elements, and wherein the step of tightening the tightening means comprises tightening the tightening element by decreasing a circumferential length thereof.

* * * * *